2,784,180
Patented Mar. 5, 1957

2,784,180

CHLORALHEMIACETAL DERIVATIVES OF SUGARS AND METHODS FOR THEIR PREPARATION

Richard Tislow, Philadelphia, and William F. Bruce, Havertown, Pa., assignors to American Home Products Corporation, New York, N. Y., a corporation of Delaware No Drawing. Application July 27, 1954, Serial No. 446,152

10 Claims. (Cl. 260—209)

This invention relates to the preparation of new and useful chloralhemiacetals of sugars and more particularly to those containing four or more chloral groups per molecule which show useful sedative and hypnotic activity.

Chloral hydrate has been known for many years to have useful sedative and hypnotic activity in both man and animals. Many practitioners have preferred this composition to those of similar utility because of its low order of toxicity and freedom from side effects. However, it suffers from several disadvantages. Firstly, it has an extremely strong and disagreeable taste and odor. Secondly, even when administered in capsule form in order to hide said taste and odor, it results in eructation and a very unpleasant aftertaste. Thirdly, it is irritating to the stomach tissues often causing heartburn, emesis, etc. Finally, because of its relative inactivity, relatively large doses are usually required in order to cause sleep.

It is therefore the object of our invention to prepare active sedative and hypnotic agents having the relative safety of chloral hydrate which do not suffer from the above disadvantages.

We have accomplished the above objective by preparing several new chloralhemiacetals of sugars having favorable threapeutic properties.

We have found that under mild conditions of reaction a mixture of chloral and certain sugars will condense to form the desired hemiacetals.

The sugars that we have found to react with chloral and form these desirable compositions are glucose, lactose and 3-methyl glucose. Depending upon the number of equivalents of chloral used, at equilibrium there may be one or more unreacted hydroxyl groups remaining in the sugar molecule. For example, the tetra- or pentachloral hemiacetals of glucose can be formed by using either 4 or 5 equivalents of chloral per equivalent of glucose. Similarly, various hemiacetals of 3-methyl glucose may be prepared. However, our experience has been that a maximum of four molecules of chloral will condense with lactose. Therefore, four equivalents of chloral would be the maximum amount required in the synthesis of the lactose compounds.

We have found the physical and physiological properties of those compounds of this class containing at least four chloral groups per molecule particularly desirable for therapeutic purposes and these are the preferred embodiments of our invention.

The reaction may be illustrated by the following equation:

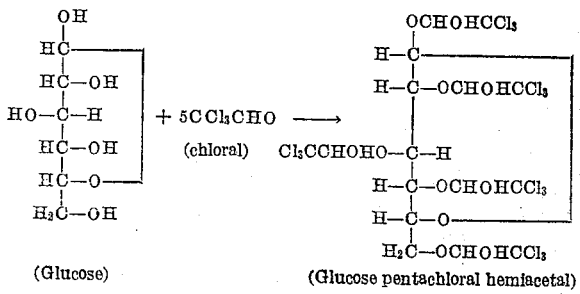

In general the reaction is carried out by mixing the proper number of equivalents of anhydrous chloral with the sugar and heating the mixture under anhydrous conditions at the temperature of reflux of chloral from the mixture, until the reaction is complete. Since overheating will cause the hemiacetal to break down into the original reactants, minimum reflux temperature is desirable toward the completion of the reaction. Completion of the reaction is determined by observation of the reflux rate of chloral. At the start of the reaction chloral refluxes rapidly; but as the reaction proceeds the reflux rate gradually diminishes. When the reaction is complete, equilibrium has been reached and the reflux rate is at a minimum, and remains constant. This point is hereafter referred to as the "point of constant reflux rate." The product will appear as a hard glassy solid that may be ground to a powder. This powder can then be incorporated into suitable dosage forms such as tablets, capsules, suppositories and the like with the proper carriers, binders and excipients.

The following examples are presented in order to point out more clearly the method of carrying out the invention but are not intended to limit its scope beyond that indicated in the claims.

EXAMPLE I

Glucose pentachloral hemiacetal

A mixture of 0.41 mole of glucose and 2.05 moles of chloral was refluxed under anhydrous conditions on an oil bath at about 120° until the point of constant reflux rate was reached (about 8 hours). Upon cooling the mixture the product hardened into a glass-like material which could be easily powdered. M. P. 63–66° C.

Optical rotation:
1% in water
1% in formamide } $[\alpha]_D^{25} + 16.5°$

Analysis.—Calculated for $C_{16}H_{17}Cl_{15}O_{11}$: C, 20.95%; H, 1.87%. Found: C, 21.57%; H, 2.20%. Soluble in benzene, ethyl acetate, chloroform and slowly in water. Slightly soluble in hot petroleum ether, methyl chloroform and carbon tetrachloride; but insoluble in these solvents at room temperature.

EXAMPLE II

3-Methyl glucose pentachloral hemiacetal

A mixture of 0.1 mole of 3-methyl glucose and 0.5 mole of anhydrous chloral was refluxed under anhydrous conditions under nitrogen on an oil bath at about 130° C. until the point of constant reflux rate was reached (about 8 hours). Upon cooling the mixture, the product hardened into a yellow colored glass-like material which could be easily powdered. M. P. (range) 53–79° C.

Analysis.—Calculated for $C_{17}H_{19}Cl_{15}O_{11}$: C, 22.1%; H, 2.06%; Cl, 56.9%. Found: C, 23.53%; H, 2.46%; Cl, 53.7%.

Optical rotation:
$[\alpha]_D^{20}$ water+11.8°
$[\alpha]_D^{20}$ formamide+10.4°

EXAMPLE III

Lactose tetrachloral hemiacetal

A mixture of .04 mole of lactose and 0.32 mole of anhydrous chloral was refluxed under anhydrous conditions on an oil bath at about 120–130° C. until the point of constant reflux rate was reached (about 10 hours). Upon cooling the mixture the product hardened into a glass-like material which could be easily powdered. Softens at 73° C., melts at 80–90° C.

*Analysis.*—Calculated for $C_{20}H_{26}Cl_{12}O_{15}$: C, 25.9%; H, 2.81%; Cl, 45.4%. Found: C, 25.8%; H, 2.95%; Cl, 46.9%.

EXAMPLE IV

*Glucose tetrachloral hemiacetyl*

A mixture of 0.2 mole (36 gr.) of glucose and 0.8 mole (117.9 gr.) of anhydrous chloral was refluxed under anhydrous conditions on an oil bath at about 120° until the point of constant reflux rate was reached. Upon cooling the mixture, the product hardened into a glasslike material which could be easily powdered. M. P. 60–85° C.

*Analysis.*—Calculated for $C_{14}H_{16}O_{10}Cl_{12}$: C, 21.9%; H, 2.10%; Cl, 55.4%. Found: C, 22.57%; H, 2.33%; Cl, 53.8%.

It is evident from the above that numerous variations are possible and are contemplated within the scope of the invention.

We claim:

1. A chloralhemiacetal of a sugar selected from the group consisting of glucose, 3-methyl glucose and lactose, said hemiacetal containing at least four chloral groups per molecule.
2. Glucose pentachloral hemiacetal.
3. Glucose tetrachloral hemiacetal.
4. 3-methyl glucose pentachloral hemiacetal.
5. Lactose tetrachloral hemiacetal.
6. The method of preparing the chloralhemiacetals of sugars selected from the group consisting of glucose, 3-methyl glucose and lactose, said hemiacetals containing $n$ chloral groups per molecule, where in the case of glucose and 3-methyl glucose $n$ represents a positive integer of at least 4, and in the case of lactose $n$ is equal to 4, comprising heating a mixture of said sugar and $n$ equivalents of chloral under anhydrous conditions at the temperature of reflux of chloral from the mixture until the point of constant reflux rate is reached and then cooling the mixture.
7. The method of preparing glucose pentachloral hemiacetal comprising heating a mixture of glucose and 5 equivalents of chloral under anhydrous conditions at the temperature of reflux of chloral from the mixture until the point of constant reflux rate is reached and then cooling the mixture.
8. The method of preparing glucose tetrachloral hemiacetal comprising heating a mixture of glucose and 4 equivalents of chloral under anhydrous conditions at the temperature of reflux of chloral from the mixture until the point of constant reflux rate is reached and then cooling the mixture.
9. The method of preparing 3-methyl glucose pentachloral hemiacetal comprising heating a mixture of glucose and 5 equivalents of chloral under anhydrous conditions at the temperature of reflux of chloral from the mixture until the point of constant reflux rate is reached and then cooling the mixture.
10. The method of preparing lactose tetrachloral hemiacetal comprising heating a mixture of glucose and four equivalents of chloral under anhydrous conditions at the temperature of reflux of chloral from the mixture until the point of constant reflux rate is reached and then cooling the mixture.

References Cited in the file of this patent

UNITED STATES PATENTS

| | | |
|---|---|---|
| 2,245,260 | Dickey et al. | June 10, 1941 |

OTHER REFERENCES

Meldrum et al.: Jour. Indian Chem. Soc., vol. 13 (1936), pp. 118–122 (5 pages). Abstracted in Chem. Abstracts, vol. 30 (1936), col. 4815–4816 (2 pages).

Pictet et al.: Chem. Abstracts, vol. 17 (1923), pp. 3018–3019 (2 pages).

U. S. Dispensatory, 24th ed. (1947), page 1399.